(12) United States Patent
Ma et al.

(10) Patent No.: US 7,450,309 B1
(45) Date of Patent: Nov. 11, 2008

(54) INTEGRATED SIGNAL MANIPULATOR FOR MANIPULATING OPTICAL SIGNALS

(75) Inventors: Jing Ma, Buffalo Grove, IL (US);
Seng-Tiong Ho, Wheeling, IL (US)

(73) Assignee: Optonet, Inc., Evanston, IL (US)

( * ) Notice: Subject to any disclaimer, the term of this patent is extended or adjusted under 35 U.S.C. 154(b) by 181 days.

(21) Appl. No.: 11/451,797

(22) Filed: Jun. 13, 2006

(51) Int. Cl.
  *G02B 27/10* (2006.01)
(52) U.S. Cl. .................................... 359/618
(58) Field of Classification Search .......... 359/618, 359/237–238, 298, 629; 358/14–16, 37, 358/129–132
See application file for complete search history.

(56) References Cited

U.S. PATENT DOCUMENTS

| | | | |
|---|---|---|---|
| 6,665,460 B2 * | 12/2003 | Derventzis et al. ............ 385/16 |
| 7,333,692 B1 * | 2/2008 | Mossberg et al. ............. 385/37 |
| 2002/0060760 A1 * | 5/2002 | Weiner ..................... 349/96 |
| 2005/0100277 A1 * | 5/2005 | Frisken ..................... 385/37 |
| 2006/0193556 A1 * | 8/2006 | Frisken ..................... 385/27 |
| 2007/0242955 A1 * | 10/2007 | Kavehrad ................. 398/130 |

* cited by examiner

*Primary Examiner*—Jessica T Stultz
*Assistant Examiner*—Mahidere S Sahle
(74) *Attorney, Agent, or Firm*—William L. Botjer

(57) ABSTRACT

An integrated signal manipulator for manipulating an optical signal. The optical signal manipulator is integrated on a single material substrate by etching a curved grating mirror. The curved grating mirror decomposes a first optical signal into focused spectral components. These focused spectral components are manipulated by signal-processing elements that are realized on the same material substrate. The manipulated spectral components are then combined by another curved grating mirror, on the same material substrate, to generate a second optical signal.

16 Claims, 9 Drawing Sheets

INTEGRATED SIGNAL MANIPULATOR FOR MANIPULATING OPTICAL SIGNALS

BACKGROUND OF THE INVENTION

The invention in general relates to a device for processing optical waves. More specifically, the invention relates to a monolithically integrated Optical Wavelength and Waveform Manipulator (OWWM).

Optical networking is now being used for digital communication in networks. Optical networks for digital communication have lesser electromagnetic interference and lower power requirements as compared to the existing electrically wired networks. Further, the bandwidth capacity of optical networks has improved due to the development of optical devices that handle multiple wavelength signals. Examples of optical devices include a waveform add-drop multiplexer, an analog phase modulator, an analog amplitude modulator, among others.

An optical device may include optical waveguides, diffraction gratings, optical lenses, and signal-processing elements. The optical waveguides direct an optical signal over the optical device. A diffraction grating decomposes the optical signal into its constituent spectral components. The constituent spectral components are converted into parallel beams by a collimating lens. Henceforth, the signal-processing elements manipulate the constituent spectral components. The signal-processing elements may include MEM switches, liquid crystal spatial light modulators, and so forth. Thereafter, a focusing lens converges the manipulated constituent spectral components to another diffraction grating. The diffraction grating combines the manipulated constituent spectral components into a processed optical signal.

A conventional optical device 100 used for waveform and wavelength modulation is illustrated in FIG. 1. Optical device 100 includes a first diffraction grating 102, an optical collimating lens 104, an array of signal-processing elements 106, an optical focusing lens 108, and a second diffraction grating 110. First diffraction grating 102 decomposes an input signal into a number of spatially separated beams according to their wavelengths. The spatially separated beams are also referred to as spectral component beams. After dispersion from first diffraction grating 102, the spectral component beams are collimated by optical collimating lens 104. Then, the spectral component beams enter into an array of signal-processing elements 106. The array of signal-processing elements 106 modulates the properties of the collimated spectral component beams such as optical amplitude and phase. Thereafter, the modulated spectral component beams are focused by optical focusing lens 108 towards second diffraction grating 110. Second diffraction grating 110 combines the focused spectral component beams into an output signal.

The components of optical device 100 are fixed at various positions in a three dimensional space and signal-processing element 106 is employed for signal manipulation. As a result, optical device 100 is relatively large in size. The large size of optical device 100 makes it difficult to integrate similar devices into optical communication and transmission devices.

In optical communication, an optical bit has a pulse length in nanoseconds. A typical data packet includes hundreds of optical bits and has a temporal length in microseconds. For processing a data-packet level or a bit-level signal, the signal processing element response time should be of the same order as the length of the signal. However, the response time of the signal-processing elements used in the conventional optical devices is in milliseconds. Further, the processing of signals is slower due to the size of the device as the signal has to travel larger distances. Therefore, conventional optical devices are not capable of conducting data-packet level and bit-level signal-processing. Their slow speed also limits the applicability of these optical devices to analog communication. Their large size leads to higher cost of manufacturing and lower device reliability.

In view of the above discussion, there is a need for an optical device that is compact, yet integrates discrete optical components and signal-processing elements. Further, the optical device should have a high processing speed to handle optical data packets and bit-level signals. Moreover, the optical device should have high spectral resolution and should be capable of modulating many constituent spectral components.

SUMMARY OF THE INVENTION

An objective of the invention is to provide a method for integrating various components of an Optical Wavelength and Waveform Manipulator (OWWM) on a single material substrate.

Another objective of the invention is to provide an optical signal manipulator that is compact in size and may be integrated with different optical devices.

Yet another objective of the invention is to provide an optical signal manipulator that is capable of processing optical signals at bit-level and data-packet level.

Still another objective of the invention is to provide an optical signal manipulator that includes discrete optical components integrated together for reducing deterioration of the optical signal.

Still another objective of the invention is to provide an optical signal manipulator that provides high spectral resolution in manipulating the optical amplitudes and phases of the constituent spectral components.

The invention is directed to an optical signal manipulator for modifying an optical signal. The optical signal manipulator is integrated on a single material substrate. The optical signal manipulator includes a first curved grating mirror for decomposing a first optical signal into a plurality of focused spectral components, a plurality of signal-processing elements for manipulating the plurality of focused spectral components, to generate a plurality of modulated spectral components, and a second curved grating mirror for generating a second optical signal by combining the plurality of modulated spectral components.

The invention is directed to a method for using a monolithically integrated optical device for manipulating an optical signal. The method includes etching a first plurality of horizontal planes along a first curved path for decomposing the first optical signal into a plurality of spectral components. Following this, a first mirror is realized by etching and coating along the first curved path for focusing the plurality of spectral components. This results in achieving the plurality of focused spectral components. The next step is to etch the plurality of signal-processing elements along the path of the plurality of focused spectral components. The plurality of signal-processing elements manipulates the plurality of focused spectral components to generate a plurality of modulated spectral components. A second plurality of horizontal planes is etched along a second curved path to generate a second optical signal from a plurality of modulated spectral components. Following this, a second mirror is realized by etching and coating along the second curved path for focusing the second signal at an output waveguide.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF THE INVENTION

Various embodiments of the invention provide an Ultra-compact and Ultra-fast Packet or Bit-sliced-Optical Wavelength and Waveform Manipulator (UFPBS-OWWM). The UFPBS-OWWM is fabricated and integrated entirely on a single material substrate. The applications of UFPBS-OWWM include packet-switched optical communication system, ultra-fast bit-level arbitrary optical waveform generators, optical wavelength add-drop multiplexer, and tunable optical channel filter.

The UFPBS-OWWM described below is monolithically integrated to provide compactness and high speed. The various components of UFPBS-OWWM and their functionalities have been described below.

Figure 1:
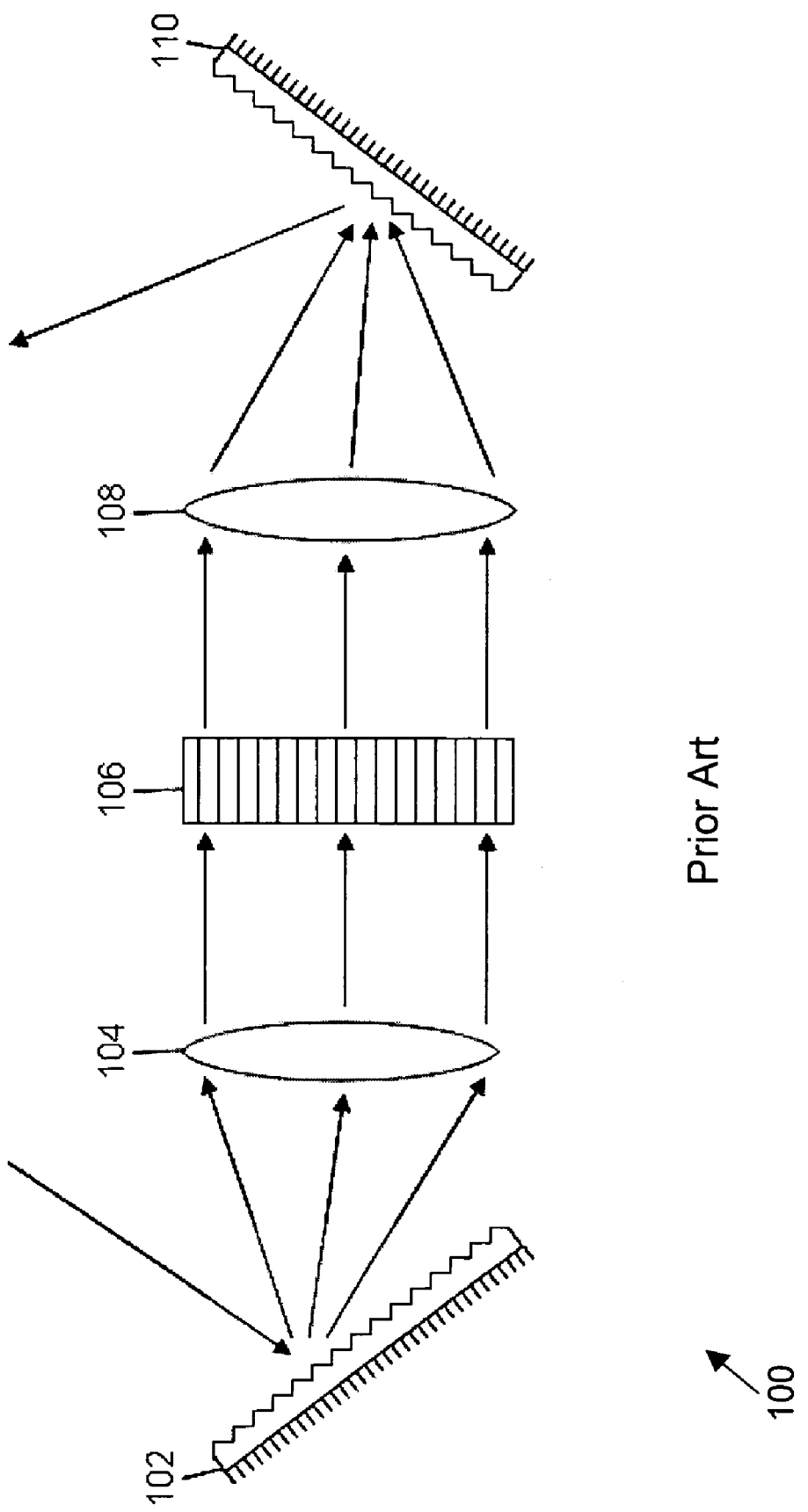
FIG. 1 illustrates a conventional optical device used for waveform and wavelength modulation.
Figure 2:
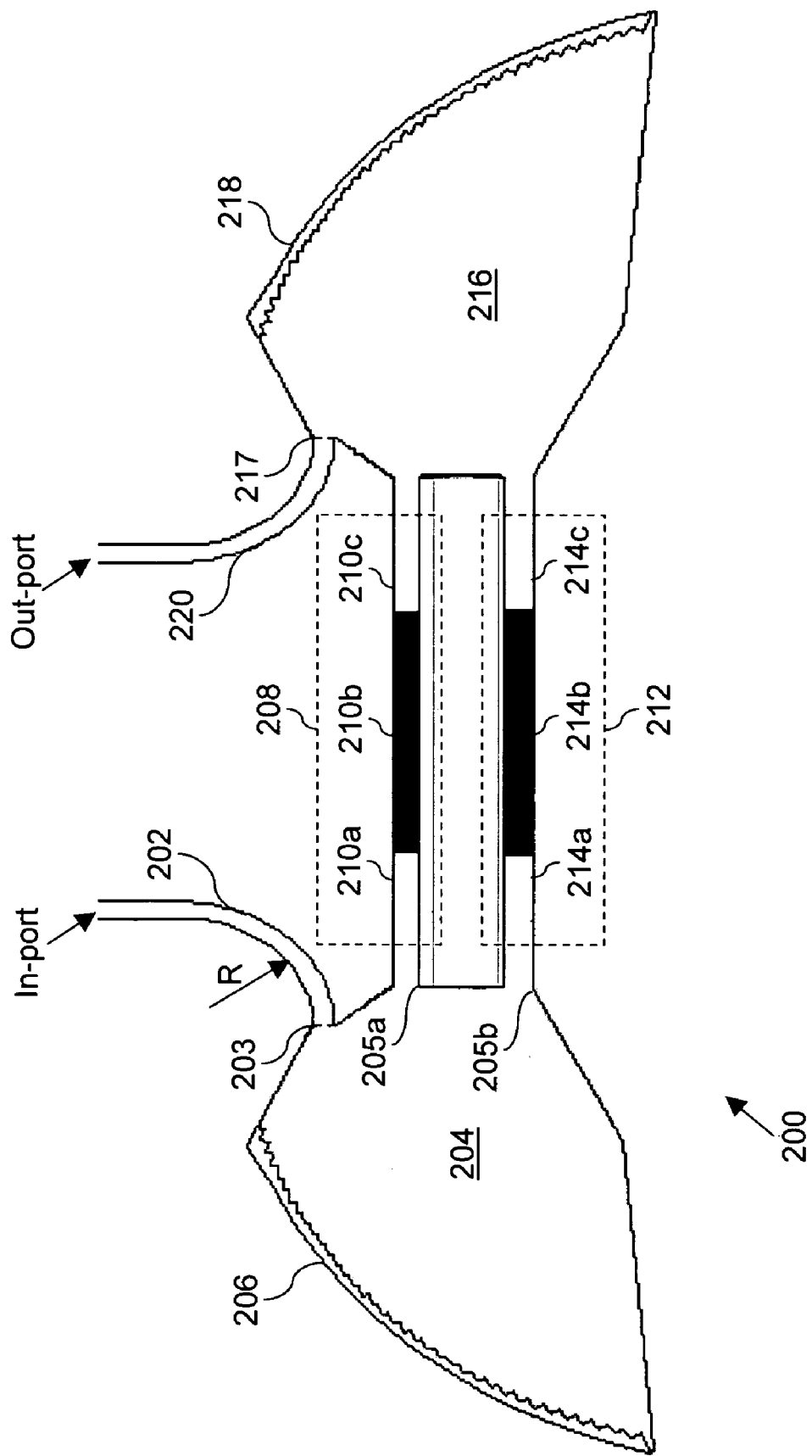
FIG. 2 illustrates an optical signal manipulator, in accordance with an exemplary embodiment of the invention.

FIG. 2 illustrates an optical signal manipulator, in accordance with an exemplary embodiment of the invention. Optical signal manipulator 200 includes an input waveguide 202, a first grating waveguide 204, a first curved grating mirror 206, signal-processing elements 208 and 212, a second grating waveguide 216, a second curved grating mirror 218 and an output waveguide 220. Signal-processing element 208 includes a first passive section 210a, an active section 210b and a second passive section 210c. Signal-processing element 212 includes a first passive section 214a, an active section 214b and a second passive section 214c.

A first optical signal enters optical signal manipulator 200 at the in-port. Thereafter, input waveguide 202 directs the first optical signal to first grating waveguide 204. First grating waveguide 204 directs the first optical signal to first curved grating mirror 206 that decomposes the first optical signal into focused spectral components. Thereafter, the focused spectral components are directed by first grating waveguide 204 to signal-processing elements 208 and 212. Active sections 210b and 214b manipulate the focused spectral components to generate modulated spectral components. Second grating waveguide 216 directs the modulated spectral components to second curved grating mirror 218. Thereafter, second curved grating mirror 218 combines the modulated spectral components to form a second optical signal, which is directed to output waveguide 220 by second grating waveguide 216. Subsequently, the second signal is directed to the out-port by output waveguide 220.

Optical signal manipulator 200 is entirely integrated and fabricated on a single material substrate. Integrating optical signal manipulator 200 on the material substrate includes realizing curved gratings, curved mirrors and optical waveguides on the material substrate. In an embodiment of the invention, the material substrate is a semiconductor material as an Indium Phosphide (InP) substrate with planar epitaxial layers of semiconductor materials such as Indium Gallium Arsenide Phosphide (InGaAsP), Indium Gallium Arsenide (InGaAs), InP, and so forth. In another embodiment of the invention, the material substrate is a semiconductor material such as Gallium Arsenide (GaAs) substrate with planar epitaxial layers of semiconductor materials such as of Aluminum Gallium Arsenide (AlGaAs) or GaAs and so forth. In yet another embodiment of the invention, the material substrate is a semiconductor material such as silicon substrate with top layer structures including a high-refractive-index wave-guiding silicon layer surrounded by low refractive index dielectric layers. In an embodiment of the invention, microfabrication techniques are used for integrating and fabricating optical signal manipulator 200 on a single material substrate. Microfabrication techniques are derived from the techniques used in microelectronics to make micro-devices such as integrated circuits. For example, microfabrication techniques include processes such as etching, thin film deposition, doping, oxidation, bonding and so forth. Suitable microfabrication techniques are known in the art.

The optical waveguides are realized by sandwiching a layer of semiconductor material with high refractive index between layers of semiconductor material with low refractive index. The sandwiched layers of semiconductor materials are known as semiconductor waveguides. The semiconductor waveguides may be a silicon waveguide, an InP waveguide, a GaAs waveguide, and the like. Further, the semiconductor waveguide is a straight waveguide, a curved waveguide, a channel waveguide, a planar waveguide and the like.

In an embodiment of the invention, input waveguide 202 is a curved waveguide. A curved waveguide includes straight and curved sections. In an embodiment of the invention, input waveguide 202 is a channel waveguide. The channel waveguides allow a single optical mode in the horizontal direction, parallel to the plane of substrate. In an embodiment of the invention, the channel waveguide is realized by etching the ridge of width W as shown in conjunction with FIGS. 3A, 3B, and 3C.

Input waveguide 202 directs the first optical signal towards first grating waveguide 204. Before entering first grating waveguide 204, the first optical signal is diffracted at a first slit 203 of slit width $S_1$. In an embodiment of the invention, first grating waveguide 204 is a semiconductor waveguide. In another embodiment of the invention, first grating waveguide 204 is a planar waveguide. The planar waveguides allow multiple optical modes in the horizontal direction parallel to the substrate. In an embodiment of the invention, the planar waveguide is realized by etching the ridge of width, W, as shown in conjunction with FIGS. 3A, 3B, and 3C. The width W of the ridge is defined by the geometry of first curved grating mirror 206 so as to allow multiple optical modes in a horizontal direction parallel to the plane of substrate.

First curved grating mirror 206 includes equidistant horizontal planes etched along a curved path and a reflecting surface etched and coated along the curved path. First curved grating mirror 206 focuses spectral components of the first optical signal to various angular directions. In an embodiment of the invention, first curved grating mirror 206 focuses the spectral components to a spot size, $S_2$ that is similar in size to the width, $S_1$ of first slit 203. In an embodiment of the invention, first curved grating mirror 206 intercepts most of the optical beams from first slit 203.

In an embodiment of the invention, first curved grating mirror 206 is an Echelle Rowland Grating. The design and specifications of a curved Echelle Rowland Grating is described in patent application Ser. No. 10/708,730 the disclosure of which is hereby incorporated by reference, 'Curved grating Spectrometer with very high wavelength resolution'. The referred patent application also provides an aberration corrected grating.

In an embodiment of the invention, first curved grating mirror 206 follows a Littrow configuration in Rowland design. In Littrow configuration, the entrance angle of the first optical signal is close to the exit angle of the spectral components of the first optical signal. The angles are measured with respect to a normal at the center of first curved mirror grating 206. The entrance angle is the angle between the normal at center of first curved mirror grating 206 and first slit 203. The exit angle is the angle between the normal at center of first curved mirror grating 206 and the exit slit 205, corresponding to a spectral component among the spectral components of the first optical signal. In an embodiment of the invention, for the spectral component with a wavelength of 1550 nanometers the angle of entrance is 55° and the angle of exit is 44°.

The curved Echelle Rowland grating mentioned above is governed by Rowland design. The design provides the position vectors of the various grooves in the curved Echelle Rowland grating. In an embodiment of the invention, first curved grating mirror 206 has position vectors of grooves, according to the following formula of Rowland design.

$$X_i = (d_i, R - (R^2 - d_i^2)^{1/2}) \quad (1)$$

where $d_i$ is the horizontal distance between the etched planes and R is the radius of curvature at the grating center.

For example, for a value of R=1000 μm and d=3.2 μm, position vectors of the grooves obtained are listed below in Table 1.

TABLE 1

| Position the grooves | | |
|---|---|---|
| $X_{-9}$ | −28.797 | 0.415 |
| $X_{-8}$ | −25.598 | 0.328 |
| $X_{-7}$ | −22.398 | 0.251 |
| $X_{-6}$ | −19.198 | 0.184 |
| $X_{-5}$ | −15.999 | 0.128 |
| $X_{-4}$ | −12.799 | 0.082 |
| $X_{-3}$ | −9.599 | 0.046 |
| $X_{-2}$ | −6.399 | 0.020 |
| $X_{-1}$ | −3.200 | 0.005 |
| $X_0$ | 0 | 0 |
| $X_1$ | 3.200 | 0.005 |
| $X_2$ | 6.399 | 0.020 |
| $X_3$ | 9.599 | 0.046 |
| $X_4$ | 12.799 | 0.082 |
| $X_5$ | 15.999 | 0.128 |
| $X_6$ | 19.198 | 0.184 |
| $X_7$ | 22.398 | 0.251 |
| $X_8$ | 25.598 | 0.328 |
| $X_9$ | 28.797 | 0.415 |

The order of diffraction is 10 for Table 1.

In an embodiment of the invention, first curved grating mirror 206 is a curved Echelle Rowland grating with aberration correction. First curved grating mirror 206 is designed to achieve a high spectral resolution. The high spectral resolution would require a small first slit 203 of width $S_1$. However, the small first slit 203 of width $S_1$ leads to a high angle of diffraction that requires a large first curved grating mirror 206 to capture most of the beam energy. Therefore, an optimum spectral resolution and size of first curved grating mirror 206 is designed.

After being decomposed at first curved grating mirror 206, the spectral components of the first optical signal are focused at exit slits 205 of width $S_3$, located at the focal plane of first curved grating mirror 206. In an embodiment of the invention, the exit slits are separated by approximately 11 μm so that the spectral components of the first optical signal with wavelength difference of 10 nm go to different exit slits. These exit slits also form the entrances for signal-processing elements 208 and 212.

Signal-processing element 208 includes first passive section 210a of length L1, active section 210b of length L2 and second passive section 210c of length L3. Passive sections 210a and 210c are optical waveguides. In an embodiment of the invention, passive sections 210a and 210c are semiconductor waveguides. In another embodiment of the invention, passive sections 210a and 210c are channel waveguides. In an embodiment of the invention, a length L1 of passive section 210a is equal to zero. In another embodiment of the invention, a length L3 of passive section 210c is equal to zero. Therefore, signal-processing element 208 includes an active section only. In another embodiment of the invention, passive section 210a has a length L1 that is greater than 50 μm, passive section 210c has a length L3 that is greater than 50 μm and active section 210b has a length L2 that is equal to 300 μm. Active section 210b includes optically active materials to manipulate a spectral component of the first optical signal. The optically active materials may be liquid crystals, organic and inorganic electro-optic materials, photorefractive materials, quantum wells, quantum wires, quantum dots, and the like. The optically active materials are characterized by non-linear optical susceptibilities and electrically controllable optical characteristics such as refractive index, optical gain, optical loss, and so forth. Active section 210b is realized on a semiconductor substrate by embedding optically active elements realized on semiconductor in core layer 304 of a semiconductor waveguide as shown in conjunction with FIG. 4.

The spectral components of first optical signal pass through the second passive sections 210c and 214c after being modified at active sections 210b and 214b. In an embodiment of the invention, second passive sections 210c and 214c are similar in form and functionality to first passive sections 210a and 214a. At the exit of signal-processing elements 208 and 212, there are entrance slits for second grating waveguide 216. In an embodiment of the invention, the entrance slits for second grating waveguide 216 are arranged so that the angle between the normal at center of second curved grating mirror 218 and the entering beam of modulated spectral components is around 44°.

In an embodiment of the invention, second grating waveguide 216 is similar in form and functionalities as first grating waveguide 204. Second grating waveguide 216 directs the modulated spectral components towards second curved grating mirror 218.

In an embodiment of the invention, second curved grating mirror 218 is similar in form and functionality as first curved grating mirror 206. Second curved grating mirror 218 also directs the second optical signal through the second grating waveguide 216, to a second slit 217 with width S4. In an embodiment of the invention, second slit 217 with width S4 is similar in form and functionality as first slit 203. In an embodiment of the invention, second slit 217 with width S4 is so placed that the angle between the normal at center of second curved grating mirror 218 and the center of the second slit 217 is 55°. Thereafter, the second optical signal is directed to the out-port, by output waveguide 220.

Therefore, the first optical signal is modified to form the second optical signal by optical signal manipulator 200. The modification carried out to the first optical signal depends on the combination of signal-processing elements 208 and 212 in optical signal manipulator 200.

In an embodiment of the invention, the signal-processing elements 208 and 212 are optical amplifiers. With an optical amplifier as the signal-processing element, optical signal manipulator 200 functions as a tunable filter for a Dense Wavelength Division Multiplexing (DWDM) network. In an embodiment of the invention, the first signal is an optical beam consisting of various DWDM wavelength channels or spectral components. Optical signal manipulator 200 selects only one spectral component to the output. For selecting only one spectral component, one optical amplifier is turned on. Other optical amplifiers are in a no power stage, the spectral components through these elements deteriorate due to diffraction at first curved grating mirrors 206 and second curved grating mirrors 218. An advantage of the tunable filter, in some applications, is that more than one spectral component may be selected for dropping. The tuning speed is limited by the speed of powering up the optical amplifier. In an embodiment of the invention, the optical amplifier is a semiconductor optical amplifier with quantum wells as the active gain/absorption material, which is turned on and off once in every 1 to 10 nanosecond.

In an embodiment of the invention, the signal-processing element includes an amplitude modulator and a phase modulator. Optical signal modulator 200 functions as an optical waveform generator or synthesizer with the amplitude modulator and the phase modulator as the signal-processing element. To synthesize an optical arbitrary waveform, each of the spectral components has to be amplitude modulated and phase modulated, independently. The spectral components of the first optical signal are decomposed at first curved grating mirror 206 to separate out each spectral component. Thereafter, each spectral component is sent through the amplitude modulator, followed by the phase modulator to control the amplitude and phase of the modulated spectral component. Subsequently, all the modulated spectral components are combined together by second curved grating mirror 216 into the second optical signal.

Figure 5:
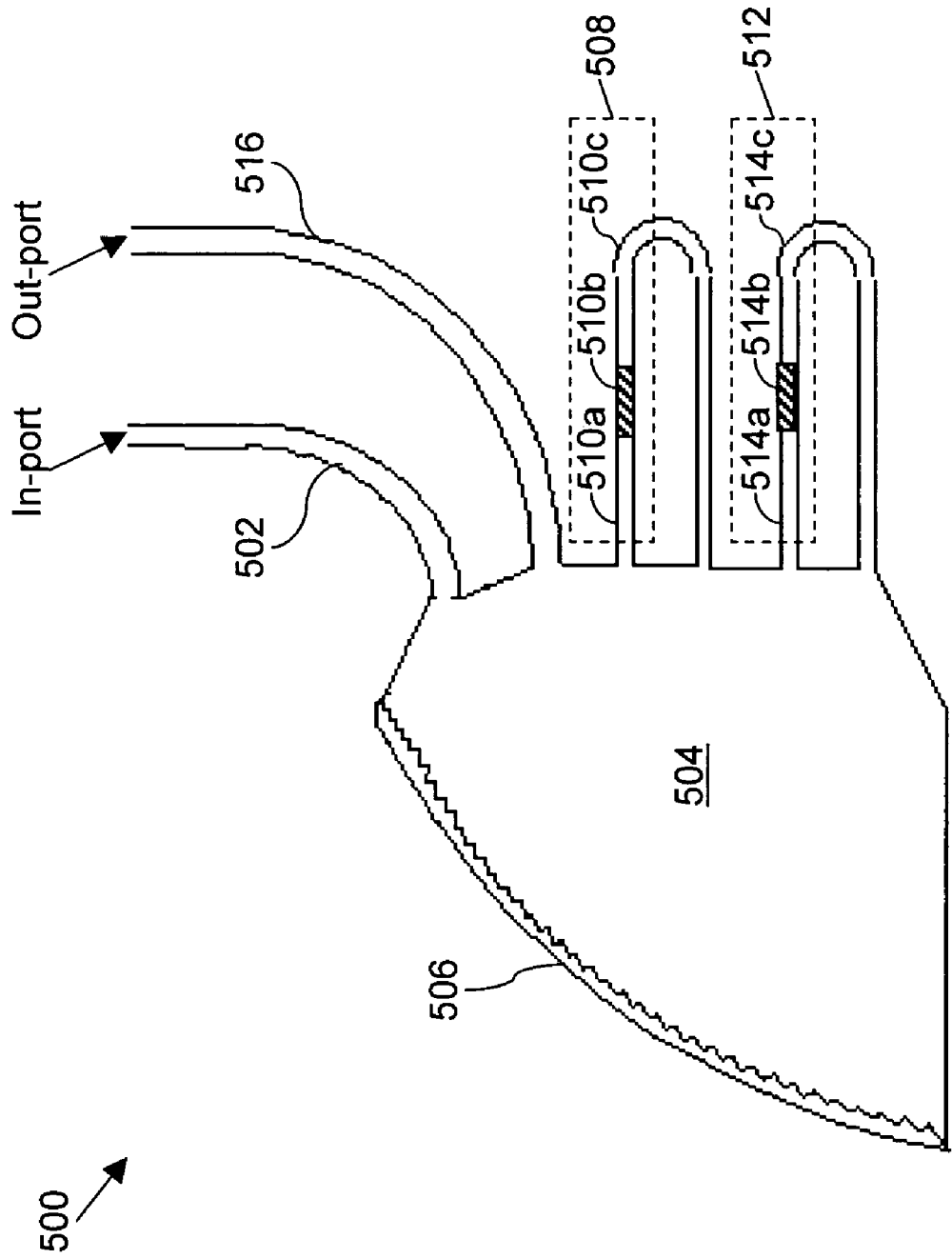
FIG. 5 illustrates an optical signal manipulator in a folded configuration, in accordance with an exemplary embodiment of the invention.
Figure 6:
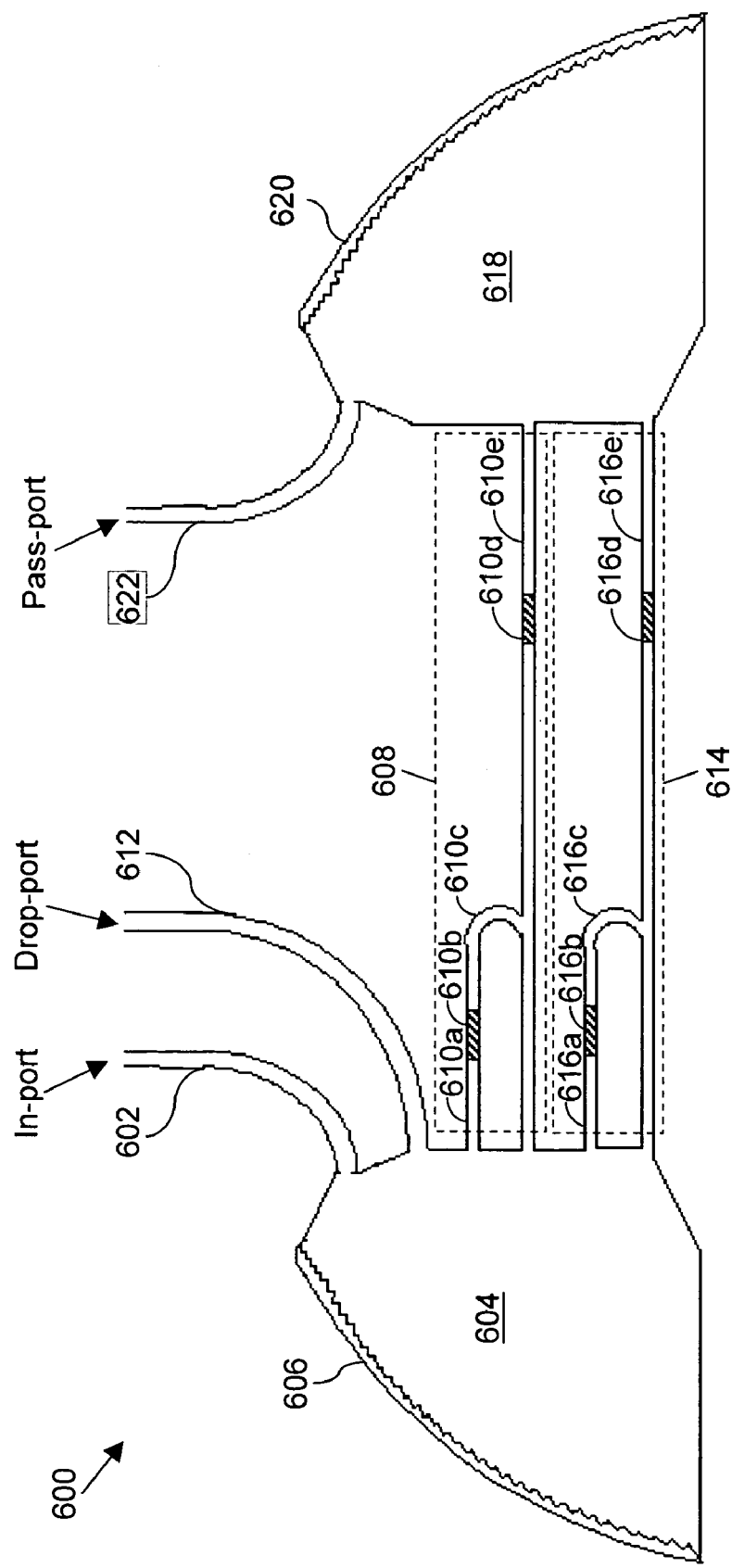
FIG. 6 illustrates an optical signal manipulator in a pass through and drop configuration, in accordance with an exemplary embodiment of the invention.

According to various embodiments of the invention, optical signal modulator 200 is realized in different geometries as shown in conjunction with FIG. 5 and FIG. 6.

Figure 3A:
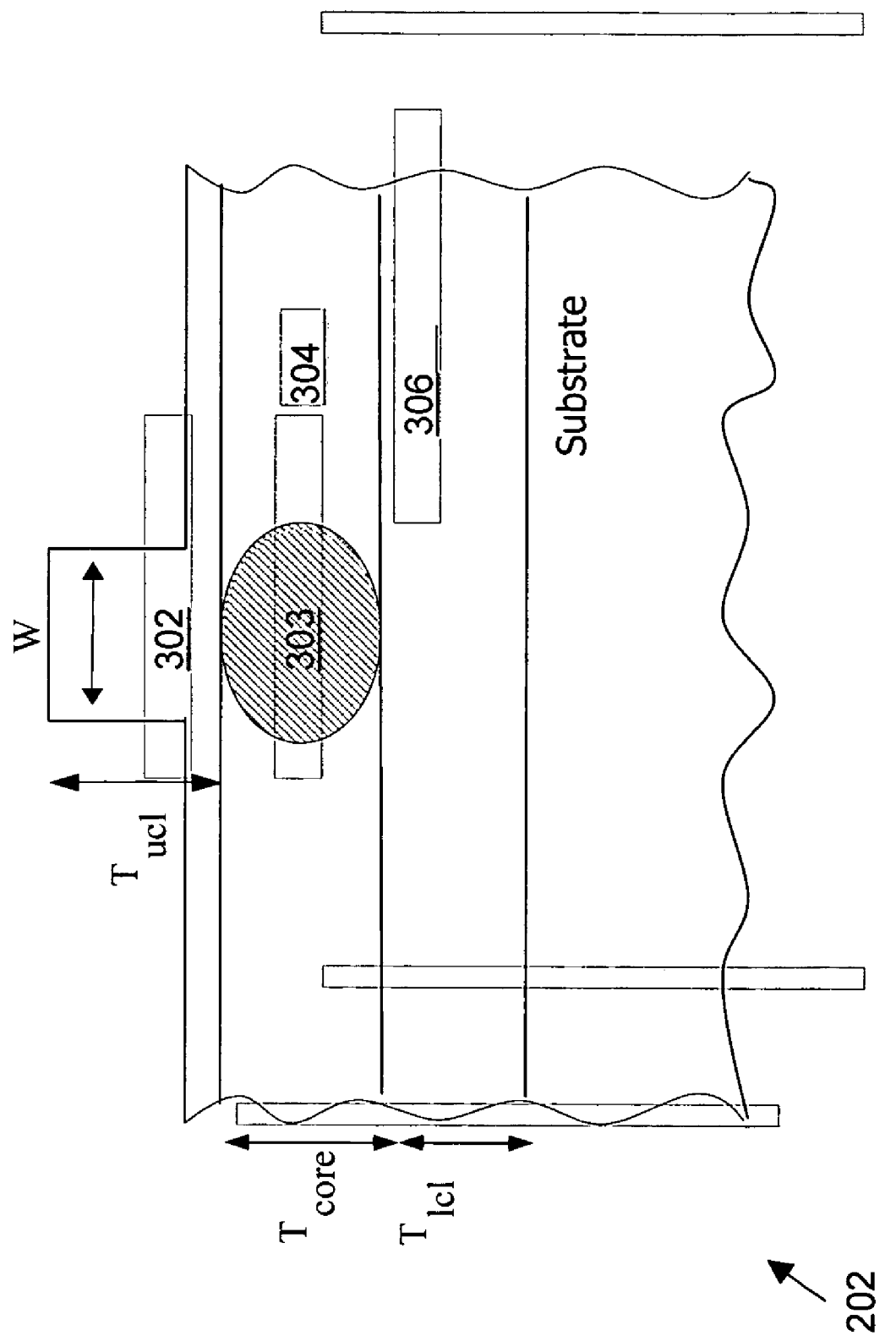
FIGS. 3A, 3B, and 3C are cross-section views of a semiconductor waveguide, in accordance with various embodiments of the invention.
Figure 3B:
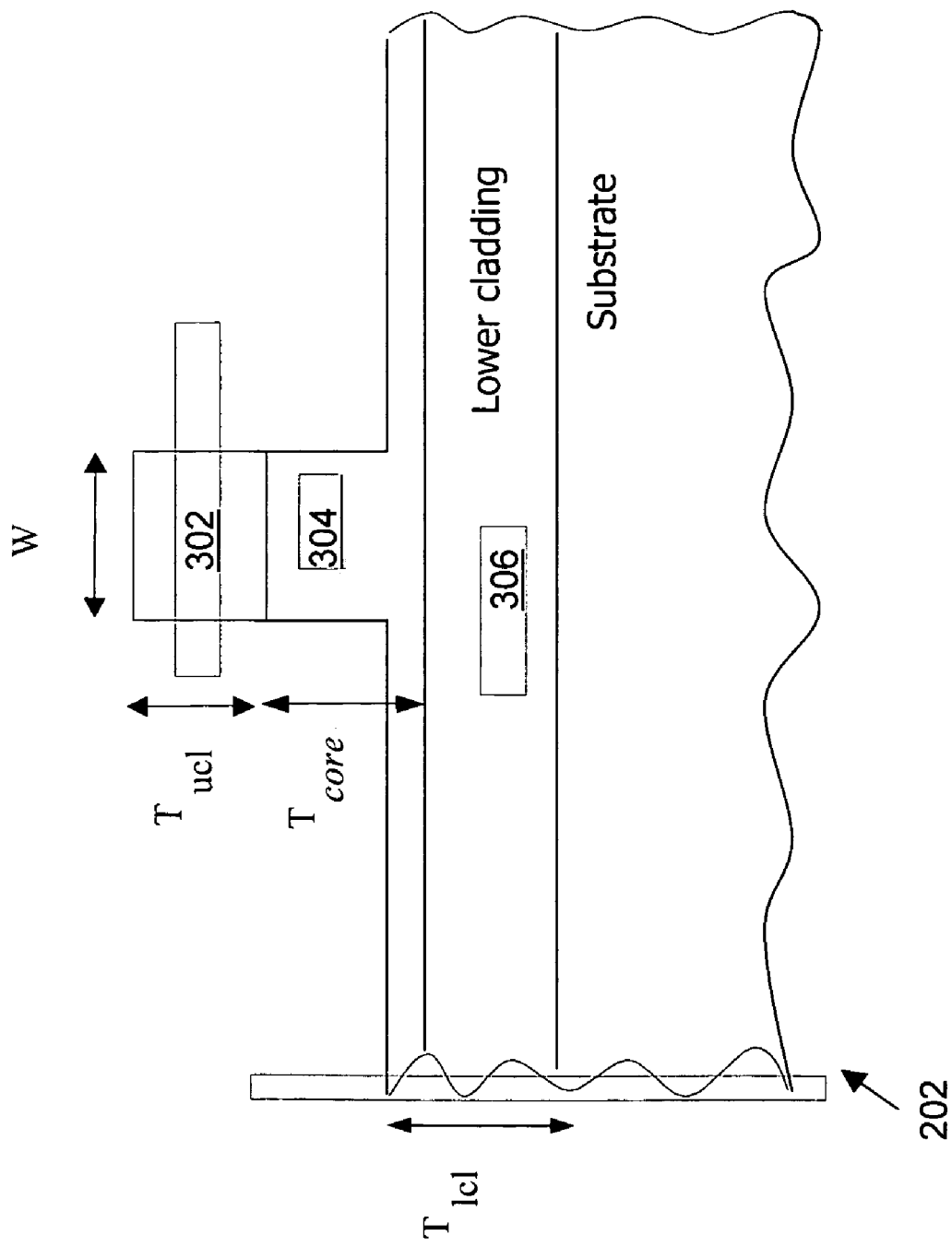
Figure 3C:
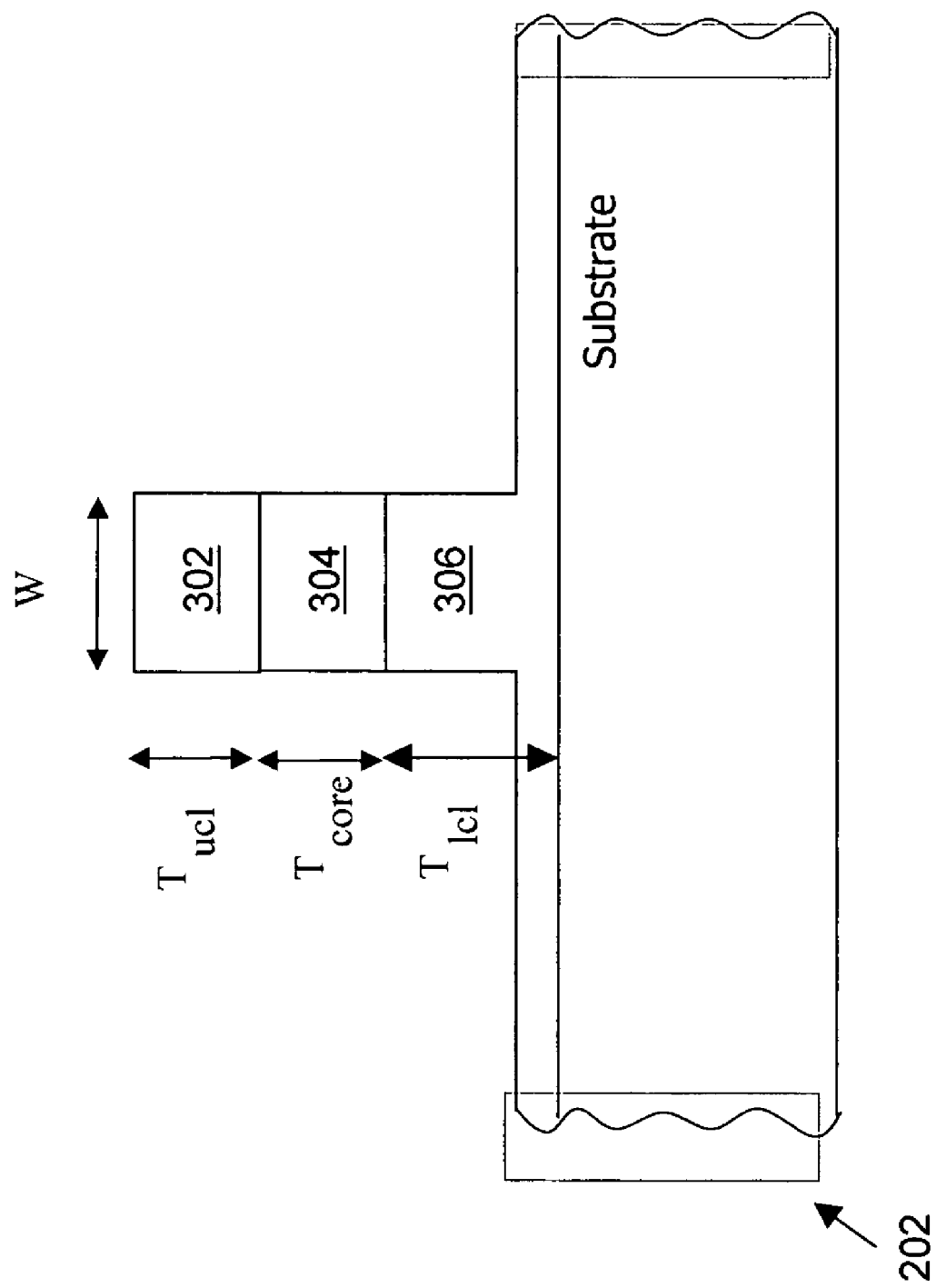

FIGS. 3A, 3B, and 3C are cross-sectional views of semiconductor waveguide 202, in accordance with various embodiments of the invention. Semiconductor waveguide 202 includes an upper cladding layer 302, a core layer 304, a lower cladding layer 306 and a substrate. The refractive index of upper cladding layer 302 and lower cladding layer 306 must be lower than that of core layer 304 for guiding an optical signal. The optical signal travels through core layer 304 with a thickness, $T_{core}$. The number of optical modes that are allowed in a vertical direction, perpendicular to the plane of substrate are determined by the thickness $T_{core}$ and the difference of refractive index between core layer 304, upper cladding layer 302, and lower cladding layer 306. In an embodiment of the invention, the thickness $T_{core}$ is selected so as to guide only one optical mode of the optical signal in the vertical direction. The number of optical modes in a horizontal direction that is parallel to the plane of the substrate, are restricted by etching a ridge structure. According to various embodiments of the invention, the ridge structures are described in conjunction with FIGS. 3A, 3B, and 3C.

FIG. 3A shows a ridge structure of width W that is realized by etching upper cladding layer 302. The ridge confines the optical signal laterally to a shaded region 303 of core layer 304. In order to enable lateral confinement of the optical beam in core layer 304, upper cladding layer 302 is etched to a partial depth. In an embodiment of the invention upper cladding layer 302 is etched to the top of core layer 304. Further, the ridge structure guides the optical signal along the waveguide 202. FIGS. 3B and 3C illustrate the ridge structure realized by etching the single material substrate down to a partial depth of core layer 304 and a partial depth of lower cladding layer 306. In an embodiment of the invention, the ridge structure realized by etching the single material substrate down to core layer 304 and lower cladding layer 306. The width, W, of the ridge is different for realizing different types of waveguides, such as channel waveguide, planar waveguide, and so forth.

In an embodiment of the invention, input waveguide 202 is a semiconductor channel waveguide that includes an upper cladding layer 302 and a lower cladding layer 306 made of InP with a refractive index 3.167, core layer 304 made of $In_{1-x}Ga_xAs_yP_{1-y}$ with refractive index 3.3. The coefficients x and y are fractions between 0 and 1. Further, core layer 304 has a thickness of 0.36 μm and the ridge has a width W of 2 μm. In addition, input waveguide 202 has the curved section with a radius R of 2 mm.

In an embodiment of the invention, first grating waveguide 204 is a semiconductor planar waveguide that includes upper cladding layer 302 and lower cladding layer 306 made of semiconductor material InP with a refractive index 3.167, core layer made of $In1_{-x}Ga_xAs_yP_{1-y}$ with refractive index 3.3, where x and y are fractions between 0 and 1. Additionally, core layer 304 has a thickness of 0.5 μm and the ridge has a width W greater than 2 μm. The width W is defined by the geometry of first curved grating mirror 206.

Figure 4:
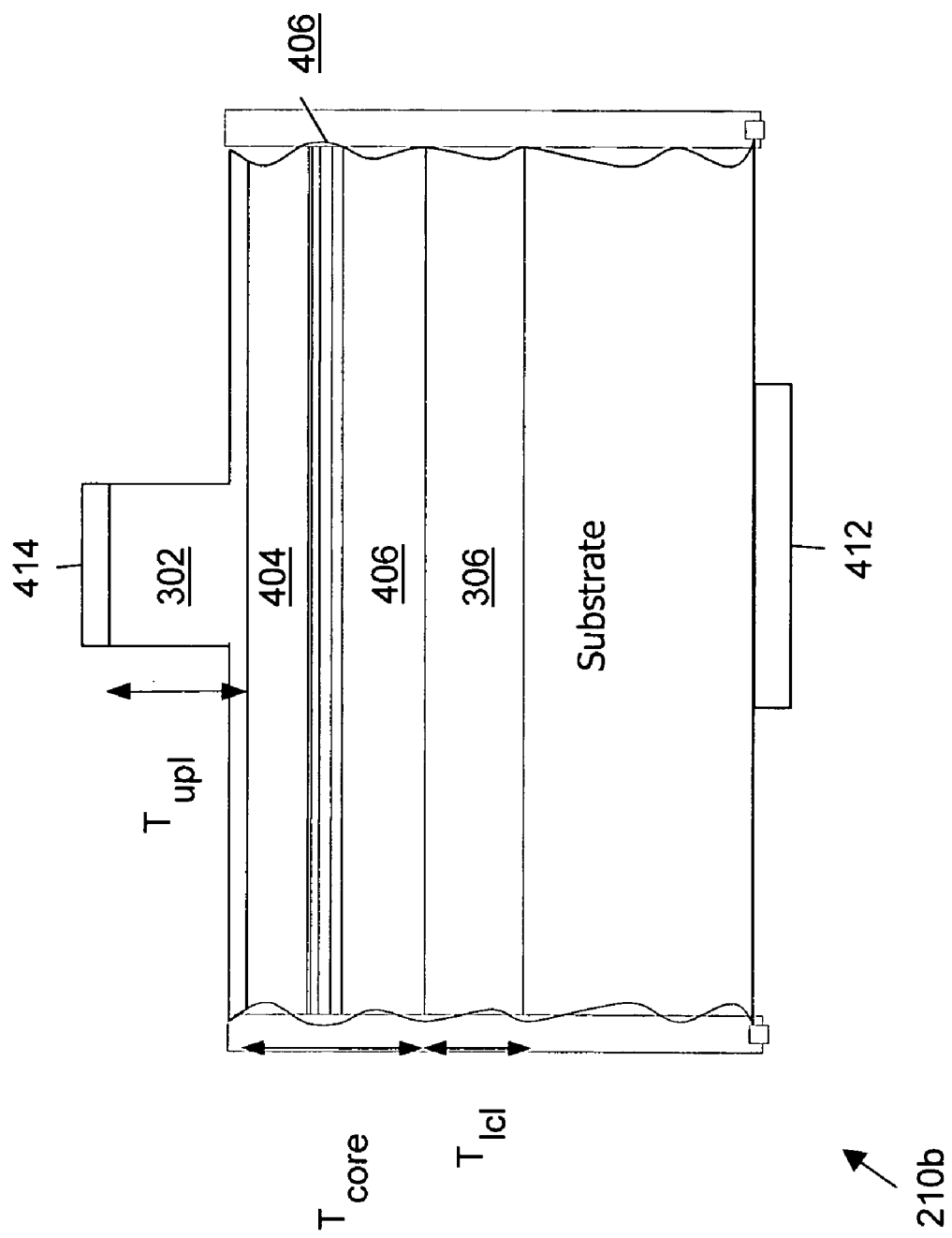
FIG. 4 is a cross-section view of an active section of a signal-processing element, in accordance with an exemplary embodiment of the invention.

FIG. 4 is a cross-section view of active section of signal-processing element 210b, in accordance with an exemplary embodiment of the invention. Active section 210b includes an upper cladding layer 302, an upper confinement layer 404, an intrinsic layer 406, a lower confinement layer 408, a lower cladding layer 306, electrode 412, electrode 414 and a substrate. Intrinsic layer 406 includes optically active elements, such as optical switches, optical amplifiers, optical absorbers, optical phase shifters, optical filters, amplitude modulators, and so forth.

In an embodiment of the invention, a ridge of a width W is realized by etching upper cladding layer 302. The ridge confines the spectral component laterally. As is well known to those skilled in the art, in order to enable lateral confinement of the optical beam, upper cladding layer 302 is etched to a partial depth. In an embodiment of the invention, upper cladding layer 302 is etched to the top of upper confinement layer 404. In another embodiment of the invention, the width W is chosen so as to allow a single optical mode in the horizontal direction.

In an embodiment of the invention, active section 210b includes upper cladding layer 302, upper cladding layer 302, which is made of p type semiconductor material as InP doped with Zinc, and has a refractive index of 3.167 and a thickness of 1.4 μm. Lower cladding layer 306 is made of n type semiconductor material as InP doped with Silicon and refractive index $n_{lcl}$ is 3.167, and thickness $T_{lcl}$ is 1 μm. Substrate is n-type InP doped with sulfur. Upper confinement layer 404 is made of p-doped $In_{1-x}Ga_xAs_yP_{1-y}$ ($\lambda_g$=1.10 μm) doped with Zinc with a concentration of $2 \times 10^{19}$ $cm^{-3}$ and thickness of 0.13 µm. Lower confinement layer 408 is made of n-doped $In_{1-x}Ga_xAs_yP_{1-y}$ ($\lambda_g$=1.26 µm) doped with Silicon with concentration of 1×10$^8$ cm$^{-3}$ and thickness of 0.13 µm. Intrinsic layer 406 is made up of quantum wells.

A quantum well is formed when a thin layer of low bandgap energy material is sandwiched between layers of high band-gap energy materials. The quantum well structure is used to amplify, transmit, absorb, or change the optical phase of light traveling through the structure.

In an embodiment of the invention, intrinsic layer 406 is quantum well structure consisting of five quantum wells. Each quantum well comprises a well of a semiconductor material such as InGaAs with a thickness of 5.5 nm surrounded by barrier materials $In_{1-x}Ga_xAs_yP_{1-y}$ ($\lambda_g$=1.26 µm). In an embodiment of the invention, the quantum well includes an upper barrier layer of semiconductor material as $In_{1-x}Ga_x$-$As_yP_{1-y}$ ($\lambda_g$=1.26 µm) with thickness of 12 nm, a first well of semiconductor material as InGaAs with thickness 5.5 nm, and four subsequent alternative layers of barrier and semiconductor material. The quantum well structure along with the wells and the barrier layers has a total thickness of 0.095 µm.

In an embodiment of the invention, upper cladding layer 302, upper confinement layer 404, intrinsic layer 406, lower confinement layer 408, and lower cladding layer 306 comprise singular layers of semiconductor material. In another embodiment of the invention, each of these layers might comprise a plurality of semiconductor layers of different materials. Multiple sub-layers are required to sufficiently confine electrons and photons to well, barrier layers and so forth, and to provide a sufficiently large optical mode for light amplification, transmission and absorption.

Electrodes 412 and 414 are attached to active elements 210b and 214b, as shown in conjunction with FIG. 4. In an embodiment of the invention, electrode 412 is made of Ti/Au and electrode 414 is made of Au/Ge/Au/Ni/Au. The current drawn across active sections 210b and 214b manipulates the spectral component of the first signal that passes through signal-processing elements 208 and 212. In an embodiment of the invention, optical signal manipulator has multiple signal-processing elements.

The exemplary dimensions mentioned above in various embodiments of the invention work best for an optical signal with a central wavelength of 1.55 µm, unless otherwise mentioned.

FIG. 5 illustrates an optical signal manipulator 500 in a folded configuration, in accordance with an exemplary embodiment of the invention. Optical signal manipulator 500 includes an input waveguide 502, a grating waveguide 504, a curved grating mirror 506, signal-processing elements 508 and 512, and an output waveguide 516. Signal-processing element 508 further includes a first passive section 510a, an active section 510b and a second passive section 510c. Similarly, signal-processing element 512 includes a first passive section 514a, an active section 514b and a second passive section 514c.

The components of optical signal manipulator 500 have similar form and functionalities as the components of optical signal manipulator 200. Optical signal manipulator 500 is a folded configuration in which, curved grating mirror 506 replaces the functions of first curved grating mirror 206 and second curved grating mirror 216. Further, after passing through grating waveguide 504, the spectral components are guided back into grating waveguide 504 by using a 180° bending waveguide. In various embodiments of the invention, first passive section 510a, second passive section 510c, active section 510b functions as the 180° bending waveguide.

Further, 180° bending waveguide causes a spatial offset of the second slit 217 with width S2. The offset angle for a diffraction order that is equal to 1, is determined as follows For input direction:

$$\sin\theta_{I1} + \sin\theta_{O1} = \frac{\lambda}{nd}$$

For turning back direction:

$$\sin\theta_{I2} + \sin\theta_{O2} = \frac{\lambda}{nd}$$

where n is refractive index of grating area, d is the grating period, λ is the diffraction wavelength.

FIG. 6 illustrates an optical signal manipulator 600 in a pass through and drop configuration, in accordance with an exemplary embodiment of the invention. Optical signal manipulator 600 includes an input waveguide 602, a first grating waveguide 604, a first curved grating mirror 606, signal-processing elements 608 and 614, a drop waveguide 612, a second grating waveguide 618, a second curved grating mirror 620 and a pass waveguide 622. Signal-processing element 608 further includes a first passive section 610a, a first active section 610b, a U-shaped section 610c, a second active section 610d and a third passive section 610e. Similarly, signal-processing element 614 includes a first passive section 616a, a first active section 616b, a Y-shaped section 616c, a second active section 616d and a third passive section 616e.

The components of optical signal manipulator 500 have similar form and functionalities as the components of optical signal manipulator 200. Optical signal manipulator 600 is a pass through and drop version. It is a combination of optical signal manipulator 200 and optical signal manipulator 500. The additional section in optical signal manipulator 600 is U-shaped section 610c. In an embodiment of the invention, U-shaped section 610c is a 3 dB coupler junction, which is used to direct the signal simultaneously to second curved grating mirror 620 and first curved grating mirror 606. Moreover, it is possible to select more than one spectral component to drop. The remaining spectral components are made to come out from pass waveguide 622.

In various embodiments of the invention, a coupler is used to integrate two or more curved grating mirrors. The coupler is a T-shaped coupler for integrating three curved grating mirrors, an X-shaped coupler for integrating four curved grating mirrors, and so forth.

Figure 7:
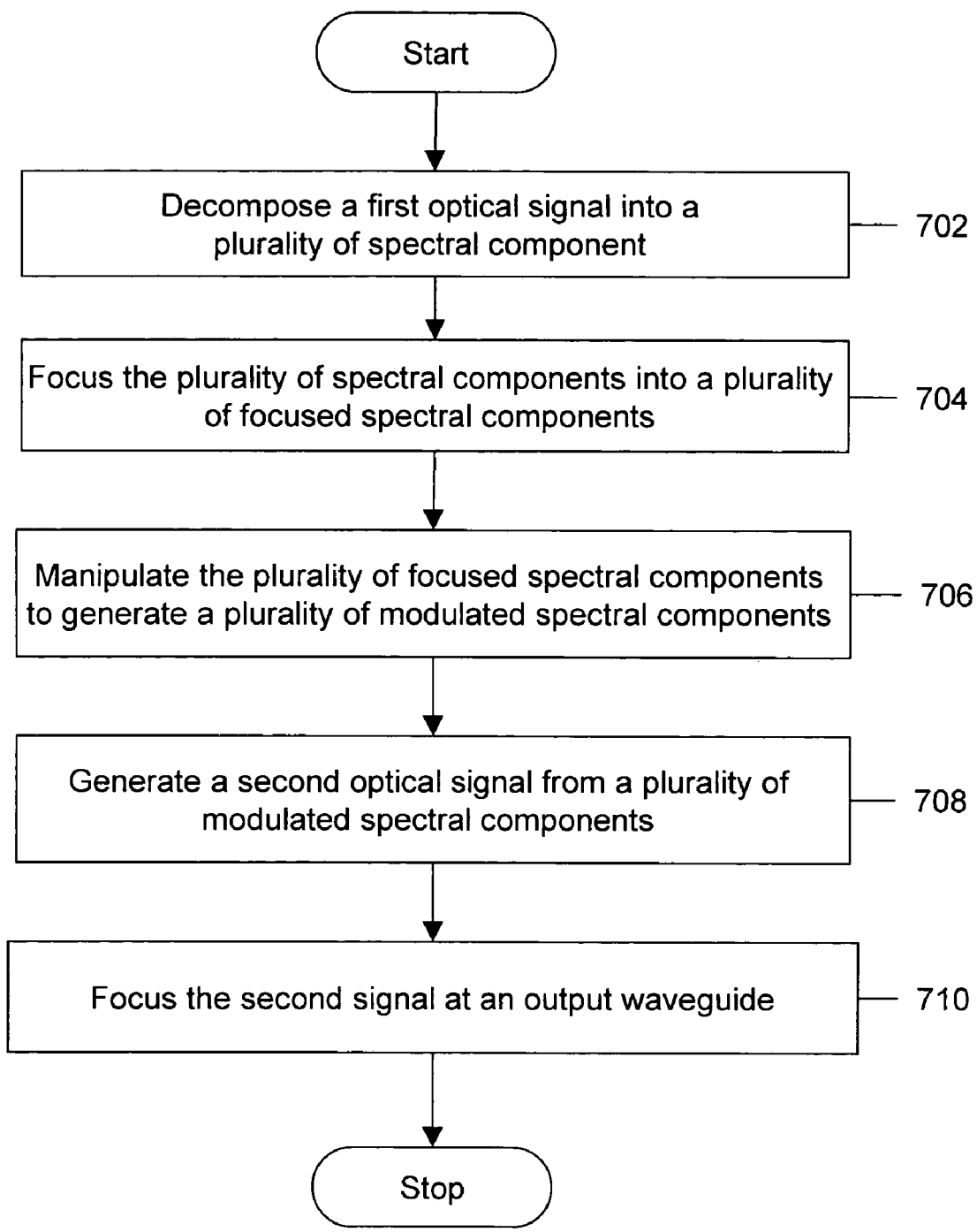
FIG. 7 is a flowchart for modulating an optical signal, in accordance with an embodiment of the invention.

FIG. 7 is a flowchart for modifying an optical signal, in accordance with an embodiment of the invention. In an embodiment of the invention, the optical signal is modified by using optical manipulator 200. At step 702, a first optical signal is decomposed into spectral components. The first optical signal is decomposed by first curved grating mirror 206. Thereafter, at step 704, the spectral components are focused by first curved grating mirror 206 into focused spectral components at exit slits 205. Exit slits 205 act as entrance for the focused spectral components to signal processing elements 208 and 212. Subsequently, at step 704, the focused spectral components are manipulated by signal-processing elements 208 and 212 to generate modulated spectral components. At step 706, a second optical signal is generated from the modulated spectral components. The second optical signal is generated at second curved grating mirror 218. Thereafter, at step 708, the second signal is focused at output waveguide 220 by second curved grating mirror 218.

Embodiments of the invention have the dual advantage of being compact and capable of handling bit-level signals. The monolithic integration of the various optical components makes the device compact and amenable to integration in optical circuits and devices. The use of curved grating has many advantages. It enables planar integration of optical components, reduces optical losses, reduces the size of the device and makes it easier to achieve aberration correction. Further, the replacement of optical lens with a curved mirror makes the device easier to realize on a semiconductor substrate. Realization of optical lens involves changing the refractive index, while curved mirror is readily realized by etching and coating the etched facet. The signal-processing elements realized in a semiconductor make processing of signals faster. Therefore, the device is capable of handling bit-level and data-packet-level signals. Embodiments of the invention are also capable of dropping more than one spectral component of an optical signal that is required in a tunable optical filter.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An optical signal manipulator whose components are monolithically integrated on a single substrate for modifying an optical signal, the optical signal manipulator comprising the following components:
   a. an input waveguide, the input waveguide directing the first optical signal to a first grating waveguide;
   b. the first grating waveguide, the first grating waveguide receiving the first optical signal from the input waveguide and directing the first optical signal parallel to a plane of the substrate, wherein the first grating waveguide is a planar waveguide;
   c. a first curved grating mirror, the first curved grating mirror decomposing the first optical signal into a plurality of spectral components and focusing the plurality of spectral components in a plurality of angular directions;
   d. a plurality of signal-processing elements, the plurality of signal-processing elements manipulating the plurality of spectral components to generate a plurality of modulated spectral components;
   e. a second curved grating mirror, the second curved grating mirror combining the plurality of modulated spectral components to generate a second optical signal; and
   f. a second grating waveguide, the second grating waveguide receiving the second optical signal from the second curved grating mirror and directing the second optical signal parallel to plane of the substrate, wherein the second grating waveguide is a planar waveguide;
   g. an output waveguide, the output waveguide receiving the output signal from the second curved grating mirror and directing the output signal out from the optical signal manipulator.

2. The optical signal manipulator of claim 1, wherein the input waveguide comprises a first slit at one end, the first slit receiving the first optical signal at the one end of the input waveguide and diffracting the first optical signal.

3. The optical signal manipulator of claim 1, wherein the first grating waveguide directs the plurality of spectral components from the first curved grating mirror to the plurality of signal-processing elements.

4. The optical signal manipulator of claim 1, wherein the output waveguide comprises a second slit at one end, the second slit receiving the second optical signal from the second grating waveguide and directing the second optical to the output waveguide.

5. The optical signal manipulator of claim 1, wherein the second grating waveguide directs the plurality of modulated spectral components from the plurality of signal-processing elements to the second curved grating mirror.

6. The optical signal manipulator of claim 1, wherein the first curved grating mirror comprises:
   a. a plurality of etched horizontal planes, the plurality of etched horizontal planes being arranged along a curved path of the substrate; and
   b. an etched mirror surface, wherein the etched mirror surface is along the curved path and enables focusing of the plurality of spectral components at multiple angular directions.

7. The optical signal manipulator of claim 1, wherein the grating of the first curved grating mirror is an Echelle Rowland Grating.

8. The optical signal manipulator of claim 1, wherein the grating of the first curved grating mirror is an aberration corrected grating.

9. The optical signal manipulator of claim 1, wherein one of the plurality of signal-processing elements comprises:
   a. a first passive section, the first passive section receiving one of the plurality of spectral components;
   b. an active section, the active section modifying the one of the plurality of spectral components to generate all the plurality of modulated spectral components; and
   c. a second passive section, the second passive section directing the one of the plurality of modulated spectral components out of the one of the plurality of signal-processing elements.

10. The optical signal manipulator of claim 9, wherein the first and second passive sections are channel waveguides.

11. The optical signal manipulator of claim 1, wherein the input waveguide is a channel waveguide, the channel waveguide enabling a single optical mode arranged parallel to the plane of the substrate.

12. The optical signal manipulator of claim 1, wherein the output waveguide is a channel waveguide, the channel waveguide directs a single optical mode parallel to the plane of the substrate.

13. A method for monolithically integrating an optical signal manipulator on a single substrate, the optical signal manipulator modifying the optical signal, the method comprising the steps of:
   a. fabricating a first plurality of horizontal planes along a first path of the substrate, the first plurality of horizontal planes decomposing a first optical signal into a plurality of spectral components;
   b. fabricating a reflecting surface along the first path of the substrate to realize a first curved grating mirror, the first curved grating mirror focusing the plurality of spectral components;
   c. fabricating a plurality of signal-processing elements along a path of the plurality of spectral components, the plurality of signal-processing elements manipulating the plurality of spectral components;
   d. fabricating a second plurality of horizontal planes along a second path of the substrate, the second plurality of horizontal planes combining the plurality of spectral components into a second optical signal; and e. fabricating a reflecting surface along the second path of the substrate to realize a second curved grating mirror, the second curved grating mirror focusing the second optical signal.

14. The method according to claim 13, further comprising the step of fabricating a first grating waveguide, the first grating wave guide:

a. receiving the first optical signal from an input waveguide of the optical signal manipulator;

b. directing the first optical signal to the first curved grating mirror parallel to the plane of the substrate; and c. directing the plurality of spectral components from the first curved grating mirror to the plurality of signal-processing elements.

15. The method according to claim 13, further comprising the step of fabricating a second grating waveguide, the second grating wave guide:

a. directing the plurality of spectral components to the second curved grating mirror, the plurality of spectral components being received from the plurality of signal-processing elements; and b. directing the second output signal from the second curved grating mirror to an output waveguide of the optical signal manipulator parallel to the plane of the substrate.

16. The method according to claim 13, wherein the fabricating step comprises at least one of the steps of etching, thin film depositing, doping, oxidizing, bonding, and coating.

* * * * *